Figure 1:
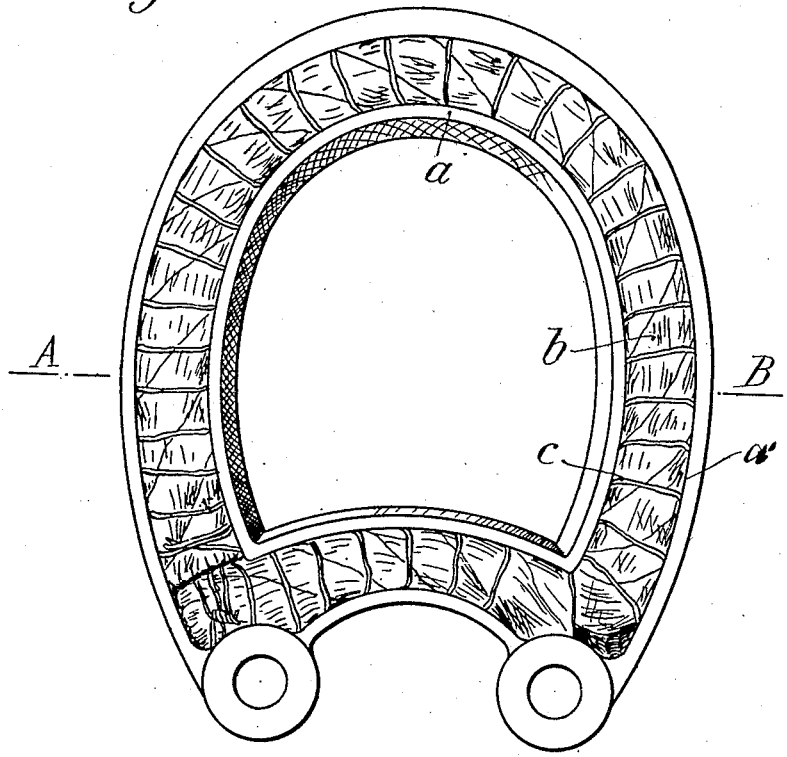

E. MOSER & K. SCHWAIGER.
HORSESHOE.
APPLICATION FILED OCT. 21, 1908.

912,711.

Patented Feb. 16, 1909.

Witnesses:
E. O. Hildebrand
M. B. Taylor.

Inventor:
Edwin Moser
Karl Schwaiger
by Georgi & Massid
Attorney

UNITED STATES PATENT OFFICE.

ERWIN MOSER AND KARL SCHWAIGER, OF MUNICH, GERMANY.

HORSESHOE.

No. 912,711.  Specification of Letters Patent.  Patented Feb. 16, 1909.

Application filed October 21, 1908. Serial No. 458,828.

*To all whom it may concern:*

Be it known that we, ERWIN MOSER and KARL SCHWAIGER, citizens of Germany, residing at Munich, Germany, have invented certain new and useful Improvements in Horseshoes; and we do hereby declare the following to be a full, clear, and exact description of the invention, such as will enable others skilled in the art to which it appertains to make and use the same.

The present invention relates to horse shoes provided with means for preventing slipping. This object is obtained by providing the lower face of the shoe with an insert of rope formed of intertwined animal or vegetable fibers and wire, the strands of which, moreover, may be advantageously bound together by an outer wrapping of wire. This insert may be manufactured in the form of a long rope and then cut into pieces of a length corresponding to the groove in each shoe. The groove is formed on the under side of the shoe preferably running entirely around or the full length of the same with inwardly diverging or undercut walls so that the rope insert can be pressed therein and held tightly on all sides by the walls of the groove without further fastening means. The outer wrapping of wire may be dispensed with although it adds materially to the durability of the insert by its binding effect.

The invention as particularly set out in the accompanying claims will be readily understood from an inspection of the drawing, in which, by way of example, is shown a horse shoe embodying the invention.

Figure 2:
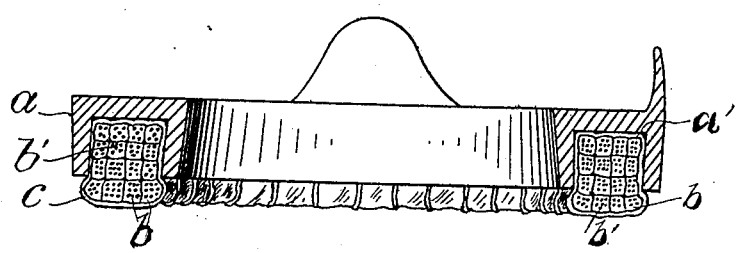

In this drawing: Figure 1 is a bottom plan view; and Fig. 2 is a cross section on the line A—B of Fig. 1.

Referring in detail to the drawing, the shoe $a$ is shown as provided with a continuous channel or groove $a'$, into which is pressed the rope insert $b$ comprised of animal or vegetable fiber and containing the intertwined wires $b'$, the several strands being held together by the wrapping wire $c$. To increase its durability and facilitate compacting and retaining it within the groove, the rope may be impregnated with any suitable material such as tar or the like.

Having thus fully described our invention, what we claim is:—

1. A horse shoe provided in its lower face with a groove, and a rope therein formed of vegetable fiber and wrapped with wire.

2. A horse shoe provided in its lower face with a groove, and a rope therein formed of intertwined fiber and wire and wrapped with wire.

3. A horse shoe provided in its lower face with a groove having under walls, and a rope therein formed of intertwined vegetable fiber and wire with a wire wrapping about said rope.

4. A horse shoe provided in its lower face with a groove, and a rope therein formed of vegetable impregnated fiber and wrapped with wire.

In testimony whereof we hereunto affix our signatures in the presence of two witnesses.

ERWIN MOSER.
KARL SCHWAIGER.

Witnesses:
ABRAHAM SCHLESINGER,
LOUIS F. MUELLER.